United States Patent [19]

Loeb

[11] 4,124,182
[45] Nov. 7, 1978

[54] WIND DRIVEN ENERGY SYSTEM

[76] Inventor: Arnold Loeb, 2956 W. Lunt Ave., Chicago, Ill. 60645

[21] Appl. No.: 850,949

[22] Filed: Nov. 14, 1977

[51] Int. Cl.² .............................................. B64C 31/06
[52] U.S. Cl. ................................. 244/153 R; 290/42; 290/55; 416/8; 416/64
[58] Field of Search ............... 244/153 R, 33, 113, 244/142; 290/42, 43, 44, 53, 54, 55; 415/2–5, 8; 416/8, 64, 79, 117, 118; 60/398

[56] References Cited

U.S. PATENT DOCUMENTS

| 144,436 | 11/1873 | Browne | 244/33 |
|---|---|---|---|
| 988,508 | 4/1911 | Reynolds | 290/42 |
| 2,933,272 | 4/1960 | Sinclair | 244/113 |
| 3,222,014 | 12/1965 | Bowden et al. | 244/113 |
| 3,582,026 | 6/1971 | Giolitto | 244/155 R |
| 3,887,817 | 6/1975 | Steelman | 415/5 |
| 3,894,241 | 7/1975 | Kaplan | 290/42 |
| 3,911,287 | 10/1975 | Neville | 290/53 |
| 3,924,827 | 12/1975 | Lois | 244/153 R |
| 3,987,987 | 10/1976 | Payne et al. | 244/153 R |
| 4,025,220 | 5/1977 | Thompson et al. | 415/7 |

FOREIGN PATENT DOCUMENTS

489,139  7/1938  United Kingdom ................ 244/153 R

*Primary Examiner*—Galen L. Barefoot
*Attorney, Agent, or Firm*—Alter and Weiss

[57] ABSTRACT

Method and apparatus using parakites, or modified parachutes, for capturing wind energy and for converting the consequent wind-induced linear motion to shaft rotation. The parakite apparatus includes a plurality of trains of parakites, with each train comprising a power line having a plurality of serially coupled parakites secured thereto. The power lines are of sufficient length to allow the parakites to reach an altitude above the earth at which prevailing winds are stronger and more uniform than at the earth's surface. Each train is secured at its earthbound end to a drum or windlass selectively rotatable in both clockwise and counter-clockwise directions to either reel in the power lines attached thereto, or to enable the power lines to be pulled upwardly and outwardly by the action of the winds on the parakites. Provision is made, including canopy lines, to selectively collapse the parakites on selected power lines to facilitate the reeling-in procedure. Gearing is provided to translate the rotational movement of each drum to a power takeoff shaft as the drum is rotated by the outward motion of the power line. Unique pulley assemblies are provided to guide the lines during winding and unwinding. The resulting shaft output is utilized to provide energy as, for example, by the operation of standard electrical generators, or air compressors.

27 Claims, 13 Drawing Figures

WIND DRIVEN ENERGY SYSTEM

This invention relates to devices for the production of useful work; and more particularly, to systems for harnessing wind energy to generate pneumatic or electric energy.

It has been said that the modern engineering era truly began when man first learned to translate non-linear motion into linear or regularly reciprocating motion. At first, such motion could be induced only by naturally occurring phenomena, such as the action of a flowing stream on a water wheel, or of the wind on the blades of a windmill.

With the coming of the industrial revolution and the inception of the internal combustion engine, a source of energy was at last available which could be supplied independent of the vagaries of nature. Or so it was thought. Increasing world populations have intensified energy requirements; and complex combinations of such factors as pollution and maintenance of environmental quality, shortages of "clean" fuels such as natural gas, and impending crucial shortages of petroleum fuels, due to finite and diminutive reserves, have combined to reassert nature's limitations of its exploitation by man.

The use of atomic energy in electrical generating plants has been successfully carried out in the recent past. However, the potential hazards inherent in the handling of radioactive material and the disposal of radioactive wastes have somewhat limited the full development of atomic energy sources.

The search for additional energy resources that are vast, non-depleting and environmentally benign, has focused on man's early sources of energy; the incident energy of the sun in its various manifestations, such as solar radiation, rivers, ocean waves and winds. In all the manifestations, except the rivers, the energy concentration is very low, resulting in a low ratio of energy yield value to the cost of equipment for the purpose of harnessing the energy. This common major stumbling block, together with the additional shortcomings peculiar to such particular manifestations of solar energy, has stood in the way of economically tapping the energy of the sun.

In the case of hydroelectric power, almost all sites of significant potential have been developed. Not only is the cost of harvesting solar radiation high, but also, except for roof tops, its use precludes the use of the ground below.

Some prior attempts to utilize cyclically or periodically occurring natural forces for the production of power have, for example, concentrated on tide and wave motion. For example, in U.S. Pat. No. 3,959,663 a float is raised responsive to ocean tides, thereby arming a weight which is subsequently allowed to fall, thereby turning a generator. U.S. Pat. No. 3,925,986 utilizes tidal changes to compress air and thereby rotate a turbine. The device is effective only during those periods of time when the tides are rising and falling.

U.S. Pat. Nos. 1,751,513 and 3,887,817 feature water activated devices in which rigid or collapsible containers are utilized to intercept the current flow of a moving body of water, and thereby turn a shaft. Such devices are limited in their capacity for energy capture and depend for their efficacy on the constancy with which the current and level of the water stream are maintained and the debris or water traffic with which the stream must contend.

U.S. Pat. Nos. 3,924,827 and 3,996,741 feature wind engaging devices which are utilized to create or store energy. The U.S. Pat. No. 3,996,741 reference utilizes conventional earth bound windmills to operate air compressors communicating with a central storage reservoir for compressed air. Conventional windmills are inherently limited by the size of the vanes and the winds, which are close to the surface of the earth. The U.S. Pat. No. 3,924,827 reference features a rigid wing which is pulled by the wind and used to turn a shaft. The rigid wing wind system requires a complex arrangement to disengage the wing to enable it to be reeled in each time it reaches its outermost limit of travel. Also, the wing must be returned close to the earth in order to be re-engaged. A further problem encountered with the rigid wing systems is that the rigid wings are inherently heavy and cumbersome; and, therefore, present a significant hazard if any of them were to accidentally fall. This hazard restricts the use of land below its flying radius. Also, the wings cannot be serially coupled.

Accordingly, the need still exists for systems and devices for power conversion which will simply and efficiently by driven by natural forces, such as winds; and which, when used over large areas, will have a low cost per energy capturing area and will not interfere with use of the land below.

Accordingly, an object of the present invention is to provide methods and apparatus for the generation of usable energy.

Another object of the present invention is to provide such methods and apparatus to be clean, non-polluting, virtually inexhaustible and reliable.

A further object of the present invention is to provide methods and apparatus for the generation of usable energy adapted to utilize natural phenomena.

Still another object of the present invention is to provide such methods and apparatus in forms simple and inexpensive to manufacture and maintain.

Yet another object of the present invention is to provide such methods and apparatus which are virtually unlimited as to size and number and which utilize winds.

Another object of the present invention is to provide such method and apparatus in forms adaptable to utilize winds occurring at various altitudes above the surface of the earth.

Another object of the present invention is to provide methods and apparatus for utilizing the winds which are automatically adjusted to obtain maximum power output with varying wind velocities.

Yet another object of the present invention is to provide such methods and apparatus utilizing a pair of parakites with one being driven outward by the wind, while the other is being reeled in.

Still another object of the present invention is to provide such methods and apparatus utilizing trains of wind driven parakites as motivating elements over a large capture area. The serially coupled plurality of parakites making up the trains multiply many fold the capturing area of the single parakite. Also, the trains act to focus the force of the wind in one line going to the drive shaft off an energy converter.

Yet another object of the present invention is to provide such methods and apparatus adapted to convert periodic and reciprocatory motion produced by the action of wind on parakites into useful shaft output.

The above mentioned and other objects and features of the invention will be best understood by making reference to the accompanying drawings, in which.

In accordance with a preferred embodiment of the invention the wind forces are captured by at least one pair of trains of parakites. The train comprises a plurality of parakites serially coupled to a power line. In this embodiment the term "parakite" is used to characterize a parachute-like device for being driven by the wind in a kite-like fashion. The individual trains of the pair are alternately driven outwardly by the wind forces or pulled inwardly by the individual reels or drums to which the trains are attached. Canopy lines attached to the canopies of the parakites in the train are used in cooperation with the power line to collapse, or "disarm", the parakites during the reeling-in process to minimize wind resistance. Similarly, the relative movement between the power lines and the canopy line is used to extend, or "arm", the parakites during the reeling-out of the trains.

A clutch and gearing arrangement insures that the drive shaft of a power converter providing the power output is always driven in the same direction and also automatically controls the "arming" and "disarming" of the alternate trains. Means, such as strain gauges and tachometers are used for controlling the load on the shaft to optimize power output.

The parakite which is furthest from the shaft is designed to act as a "sky anchor". It is connected to the trains through the canopy line of the penultimate parakite. The canopy line is coupled to the shroud lines of the "sky anchor" parakite; but not to its canopy, since it always remains "armed". There is no power line connection to this parakite. To increase the lift of this outermost parakite; it is designed to be inflated with lighter than air gas.

Further, in one embodiment, lighter than air balloons are used in conjunction with the parakites to, among other things, maintain the trains at desired altitudes and angular attitudes. By attaching the balloons to the point where upper shroud lines attach to the canopies, the stability of the parakites is enhanced, since the canopy is maintained in a fixed orientation. Thus, new, unique and efficient systems and methods for using wind energy are provided.

Figures 1, 2, 3:
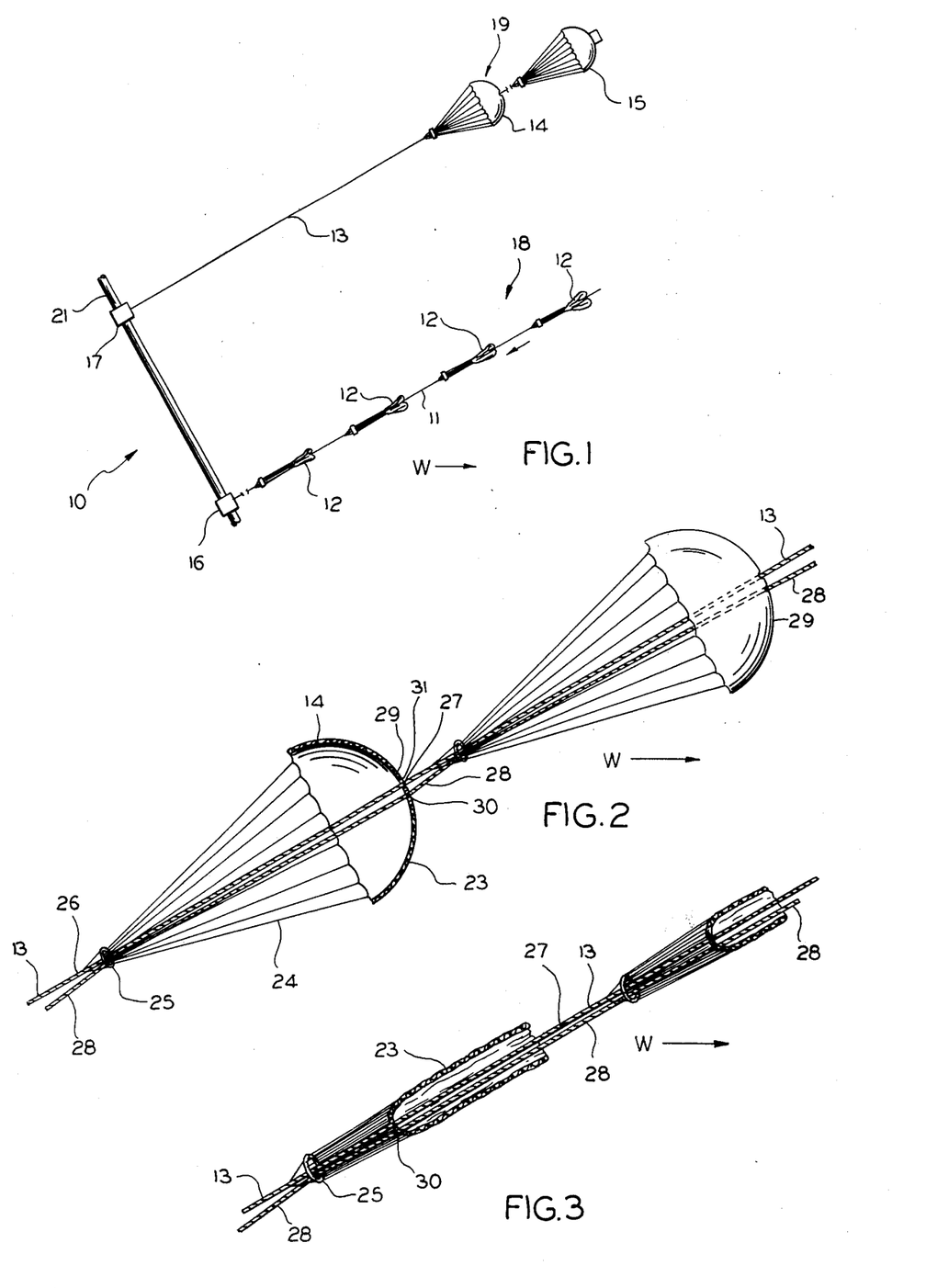
FIG. 1 illustrates a pair of parakite trains with one train having parakites in the collapsed attitude and the other train having parakites in the extended attitude.
FIG. 2 is a detail of a portion of one such train featuring two extended parakites.
FIG. 3 illustrates the parakites of FIG. 2 in the collapsed attitude.

Referring now to FIG. 1, the numeral 10 indicates generally a plurality of parakite trains featuring shaft-mounted power lines characterized by lines 11 and 13 with parakites serially mounted thereon. Power line 11 is illustrated as serially connecting parakites 12 of train 18 in a collapsed, or "disarmed", attitude; while line 13 is illustrated as serially connecting parakites 14 of train 19 in a fully extended, or "armed", attitude.

In this embodiment the outermost parakite, such as parakite 15 on line 13, may be filled with lighter-than-air gas, such as helium, as will be described in greater detail hereinbelow. Power lines 11 and 13 are shown secured at their earthbound ends at drums 16 and 17, respectively. In practice the lines are spaced apart by special pulley arrangements a sufficient distance to minimize interference between the trains. The drums themselves are relatively close to each other on shaft 21. Also, to minimize interference between the trains, the altitudes of the trains are controlled.

Figure 11:
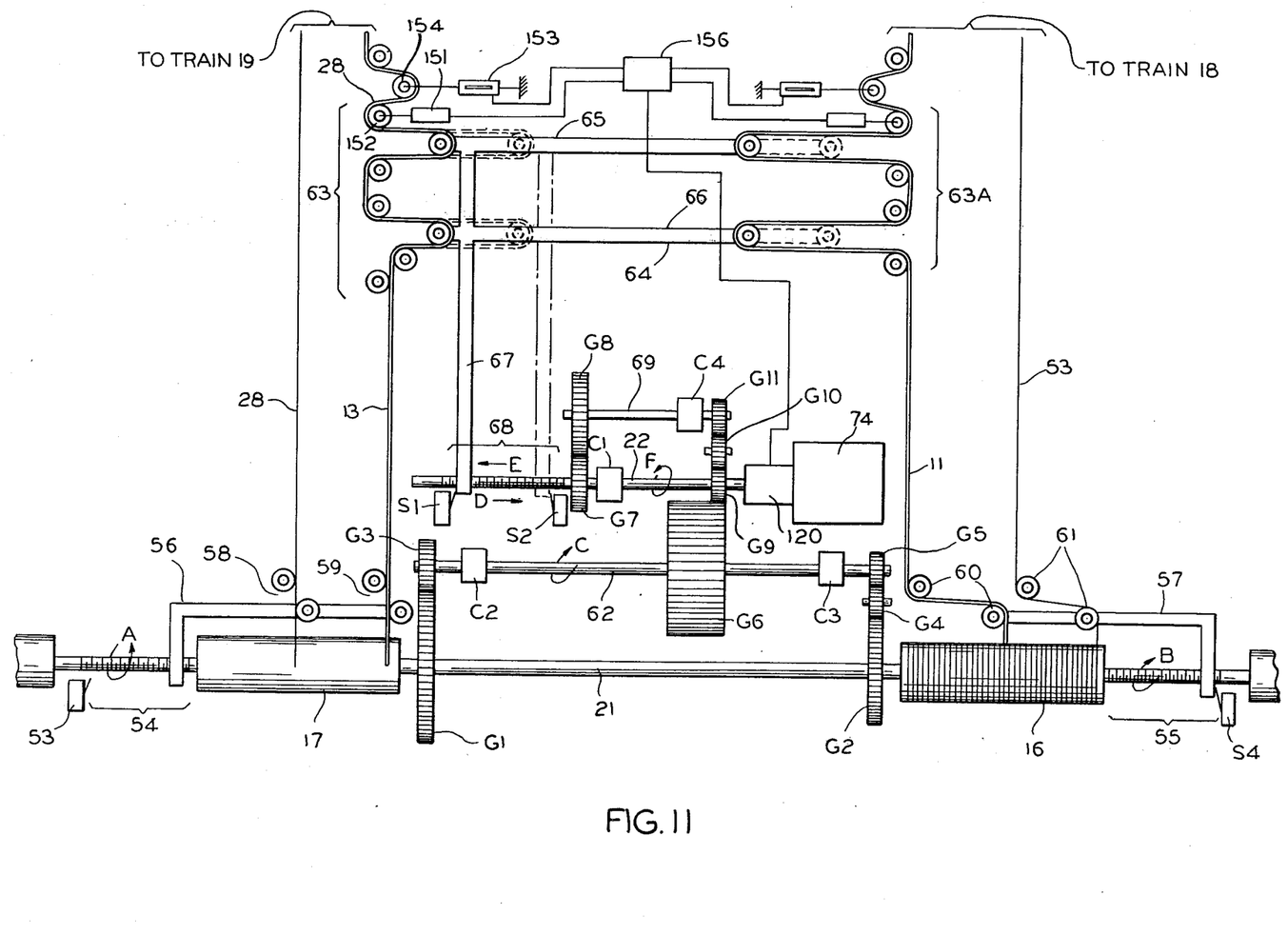
FIG. 11 is a plan view of the gearing arrangement utilized to transmit rotation to a work shaft.

As illustrated schematically in FIG. 1, and in greater detail in FIG. 11, drums 16 and 17 are mounted on drum shaft 21 and are rotatably supported in any convenient or well known manner. It should be understood that while FIG. 1 shows only the power lines 11 and 13 of the trains 18 and 19, for reasons of clarity, other lines are normally included.

The operating principle of my device may be described as follows. As winds fill the parakites of train 19 and force the train outward, power line 13 is unreeled, turning drum 17, and thus rotating drum shaft 21. In a manner to be more fully set forth hereinbelow, as power line 13 is unreeled from drum 17, power line 11 is coiled around drum 16. As illustrated in FIG. 1, the parakites of train 19 are in the fully extended, or "armed", attitude; while the parakites of train 18 are in an "unarmed" attitude. Thus, for example, drum shaft 21 is rotated in a first direction, while train 19 is drawn outward and train 18 is reeled inward. When train 18 is reeled in and train 19 is extended to the extent desired, then rotation of drum shaft 21 is reversed and train 18 is forced outward, while train 19 is reeled in. In this manner, much as in the manner of an internal combustion engine having oppositely disposed pistons connected by piston rods to a central shaft, the rotational movement of drum shaft 21 is transmitted to continuously turn the shaft of an energy conversion device, such as shaft 22 of FIG. 11, by a gearing system to be more fully described hereinbelow.

FIG. 2 illustrates, in section, fully extended parakites 14 on power line 13. Means, including power line 13, are provided for serially coupling the parakite 14 in train 19. In this embodiment parakite 14 includes a canopy 23 with shrouds, such as shroud 24, attached about its periphery. The shrouds are coupled to shroud ring 25, which is secured to the power line 13 at 26.

Means are provided for selectively "arming" (extended attitude) or "disarming" (collapsed attitude) the parakites of a train. More particularly, a second line, such as canopy line 28, is passed through shroud ring 25 and is secured to crown 29 of canopy 23 at 30 and it continues to the next canopy. Canopy aperture 31 slidingly accommodates power line 13 to enable the power line to couple to the the shroud lines and shroud ring of the next parakite in the train. The canopy 23 is drawn along with power line 13 responsive to the inward or outward play of the power line 13 relative to the canopy line 28.

When rewinding power line 13, it is desirable to collapse parakite 14 to present as little resistance as possible during the rewind operation. To that end, means are provided for lengthening the power line relative to the canopy line. As shown in FIGS. 2 and 3, when the train is in the "armed" attitude, the points 27 and 30 on the power line and the canopy line, respectively are juxtaposed to each other. In the "disarmed" attitude the point 30 on the canopy line is far below the point 27 on the power line. This indicates that the power line moves outwardly relative to the canopy line for the "disarming" process and inwardly relative to the canopy line for the "arming" process.

Figures 4, 5:
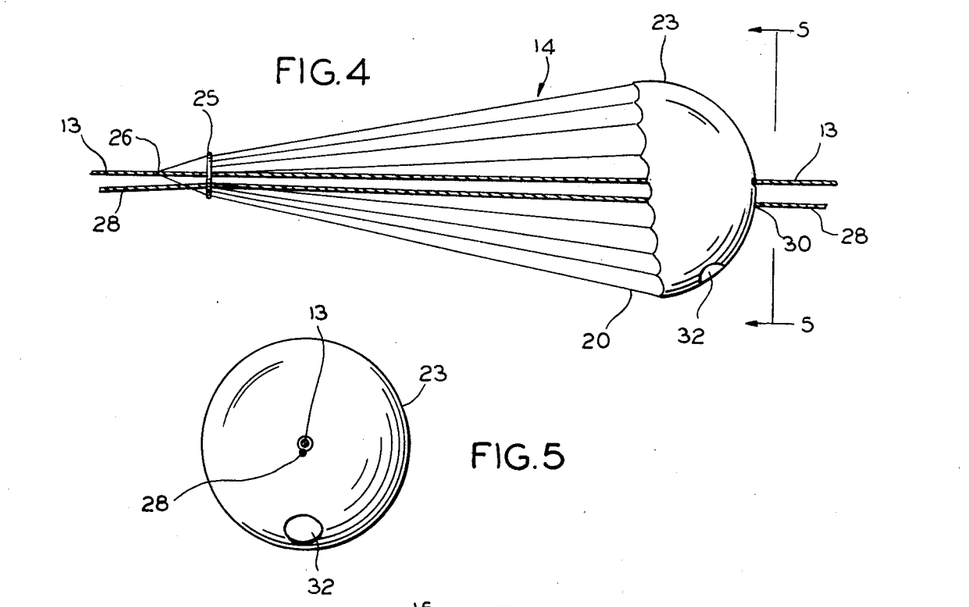
FIG. 4 is a side view of a single extended parakite.
FIG. 5 is a view along 5—5 of FIG. 4.

Means are provided to stabilize parakite 14 while it is in the extended, or "armed", attitude. For example, wind port 32 is provided, as shown in FIG. 4, to enable a portion of the wind stream to pass directly through canopy 23. Another view of wind port 32 is found in FIG. 5.

Further stability for parakite 14 may be provided by biasing canopy 23 to allow a portion of the wind stream to spill air from the bottom of the canopy, as shown at 20. Such an arrangement enables the parakite to therefore maintain a more stable angle of orientation with respect to the ground. Additional means of stabilization in the form of lighter-than-air balloons will be described later.

Figure 6:
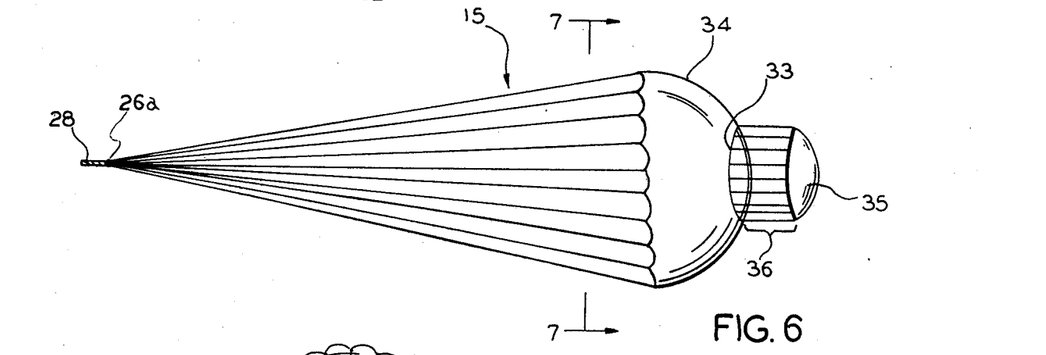
FIG. 6 is a side view of a lighter-than-air inflated parakite.
Figure 7:
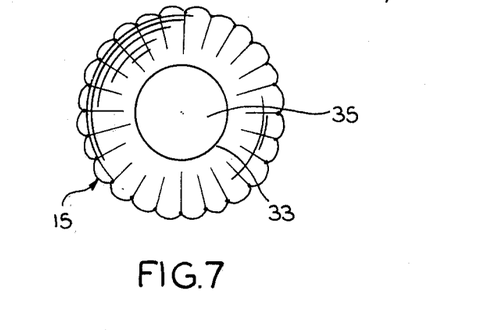
FIG. 7 is a view along 7—7 of FIG. 6.

As illustrated in FIG. 6, the last or outermost parakite in each train, characterized in this embodiment by parakite 15, functions as a "sky anchor". The final parakite 15 is coupled to the train through the canopy line 28. The shrouds of parakite 15 are connected to line 28 at 26A. There is no direct connection to the power line 13. Thus, the power line 13 terminates at the shroud ring of the penultimate parakite of the train. The sky anchor 15 functions to:

(1) keep the canopy line taut at all times to, among other things, facilitate the "arming" and "disarming" process; and
(2) maintain the "disarmed" train at approximately the same altitude as the "armed" train to avoid wasting the energy that otherwise would be expended in returning to the "armed" train's attitude.

Means are provided to increase stability of sky anchor 15 during variations in wind velocity. More particularly, drag variator means are provided. In this embodiment the drag variator means includes an opening 33 in the crown of canopy 34 of sky anchor 15. Drag flap 35 is sized to overlap drag variator opening 33 and is attached to canopy 34 by a plurality of elastic cords 36 which, in a heavy wind, stretches thereby allowing air trapped by canopy 34 to pass through drag variator opening 33. As the wind velocity increases, cords 36 stretch further outward enabling more air to pass drag opening 33 to decrease the drag and further stabilize sky anchor 15.

Figure 8:
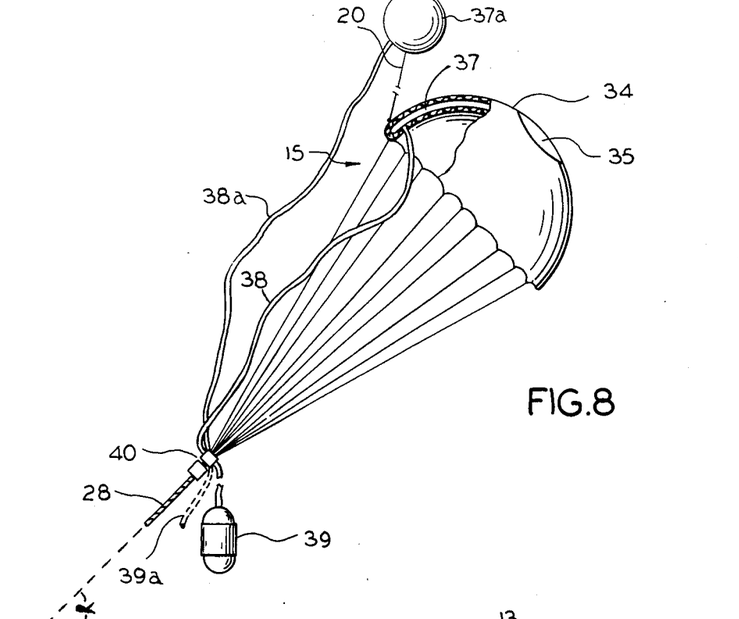
FIG. 8 is a partial sectional view illustrating the inflating mechanism of the helium inflated parakite.

Additional lift means are provided by the "sky anchor", as in FIG. 8. More particularly, for situations when little or no wind is present, or when the train is "disarmed", sky anchor 15 has a lighter-than-air gas chamber 37 formed integrally within canopy 34. Gas supply line 38 is provided to communicate between gas chamber 37 and gas supply tank 39. In this embodiment the gas employed is helium.

The lift achieved by sky anchor 15 is regulated by the automatic valve mechanism indicated at 40 adapted to respond to changes in tension on power line 13 to inflate or deflate chamber 37. For example, with tension at or above a predetermined level, valve mechanism 40 remains closed. When a decrease in tension, indicating insufficient wind to maintain the train aloft, is sensed, automatic valve mechanism 40 operates to enable helium to enter chamber 37. Thus, the train stays aloft during periods of winds that are normally insufficient to keep the train in the air.

A further preferred embodiment of the sky anchor uses auxiliary lighter-than-air gas balloon means, such as balloon 37A, to add to the lift of the sky anchor. The balloon is supplied with the gas through conduit 38A. The conduit may be supplied with gas from the ground through tube 39A entering valve 40, rather than using container 39. The balloon is attached to the "sky anchor" 15 by balloon lines, such as line 20, shown coupled to the canopy at the shroud lines.

Another preferred embodiment uses lift balloons with each of the parakites. The balloons are supplied gas either by containers, such as container 39, or through tube 39A coming from the ground. The tube may serve as the core of the canopy line 28, for example.

Figures 9, 10:
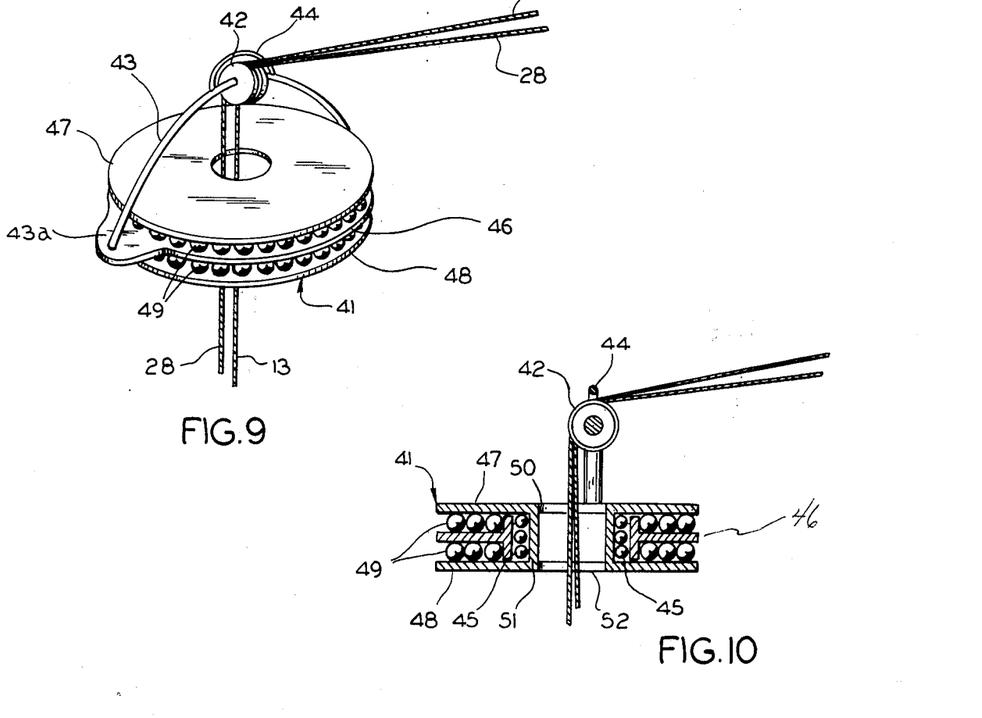
FIG. 9 is a perspective view of a line pulley arrangement.
FIG. 10 is a partial side sectional view of the pulley arrangement in FIG. 9.

While aloft, the parakites, and, consequently, the power lines and canopy lines are subject not only to the force of the wind stream, but also to the many and sudden changes in direction of the wind encountered. To track the wind and to facilitate smooth operation of the winding and unwinding mechanisms, specially designed pulley assemblies, best illustrated as 41 of FIGS. 9 and 10, are mounted above the drums and used to guide the power and canopy lines to the respective drums onto which they are to be wound.

In a preferred embodiment power line 13 and canopy line 28 are directed to multi-channel pulley 42 rotatably mounted on arched bail 43. A retainer 44 mounted to the bail 43 passes over the top of pulley 42 and prevents the lines from escaping. To accommodate sudden shifts in direction and velocity of wind stream W, the bail 43 is mounted on opposite ears, such as ear 43A, which lie along a chord rather than the diameter of center plate 46. The lines pass over the off-centered pulley and down through aperture 50. Torque is generated by changes in wind direction to rotate plate 46, because the bail is off-centered.

Fixed upper plate 47 and lower plate 48, together with bearings 49, provide free rotation of center plate 46. A tangent to the outer periphery of pulley 42 and center hole 50 remain in constant fixed spatial relationship one to the other, notwithstanding the rotation. As power line 13 and canopy line 28 are directed over pulley 42, they are passed through upper plate aperture 50, lower plate apertures 52 and are directed to their respective reeling mechanisms, as set forth in greater detail hereinbelow. Bearings 45 minimize friction between plate 46 and center hub 51 joining upper plate 47 and lower plate 48.

One preferred embodiment of the gearing utilized to translate the periodic two-way rotational motion for drum shaft 21 to the one-way rotational motion of energy converter shaft 22 is best shown in FIG. 11. As therein illustrated, drum 17 is in a fully unwound attitude, while drum 16 is in a fully wound attitude. During the time drum 17 is unwinding, drum shaft 21 is rotating in direction A and is winding power line 11 and canopy line 53 onto drum 16.

When drum 16 is fully loaded and drum 17 fully unloaded, or when it is desired to reverse the operation of the trains 18 and 19, a sequence of mechanical operations collapses, or "disarms" parakites 14 of train 19; while, substantially simultaneously extending, or "arming", parakites 12 of train 18. When this occurs, wind stream W engages "armed" parakites 12 and draws them outwardly, thereby reversing the rotation of drum shaft 21 to direction B; and thus, simultaneously, winding power line 13 and canopy line 28 onto drum 17.

As illustrated herein, segments 54 and 55 of drum shaft 21 are threaded with winding arms 56 and 57 threadably drawn along segments 54 and 55. Winding arm 56 has pulley assemblies 58 and 59 mounted thereon to guide power line 13 and canopy line 28, respectively, onto drum 17; thus insuring uniform coiling of power line 13 and canopy line 28 onto drum 17. Similarly, pulley assemblies 60 and 61 mounted on arm 57 guide canopy line 53 and power line 11 onto drum 16.

The rotational motion of drum shaft 21 is transmitted to idler shaft 62 by gears G1 and G2. Drum gear G1 is permanently rotatably meshed with idler gear G3; while drum gear G2 is permanently meshed with idler gears G4 and G5.

Engagement or disengagement of drum gears G1 and G3 or drum gears G2, G4 and G5 is accomplished, respectively, by idler clutches C2 and C3. The operation of either idler clutch C2 or idler clutch C3 is determined by the direction of rotation imparted to drum shaft 21. If, for example, the drum 17 is unwinding, then the drum shaft 21 is rotated in direction A and winding arms 56 and 57 are moving to the right. Then idler clutch C2 is engaged, and idler clutch C3 is disengaged. Gear G1 is driving idler shaft 62 in direction C via gear G3.

When drum 16 is unwinding, drum shaft 21 is rotated in direction B, and winding arms 56 and 57 are moving to the left. During such rotation, idler clutch C2 is disengaged and idler clutch C3 is engaged. Drum gear G2 then rotates gears G4 and G5 to again provide rotation of idler shaft 62 in direction C. In this manner, a steady, unidirectional rotation is imparted to idler shaft 62 independent of the changes in direction of rotation imparted to drum shaft 21.

Rotation of the idler shaft 62 in direction C imparts a like rotation to fly wheel gear G6 which, in turn rotates a drive shaft, such as drive shaft 22, shown coupled to a generator 74 through a variable speed power drive mechanism 120 to produce electrical energy. It should be understood that a commercially available air compressor may be used in place of the generator.

As set forth above, parakites 12 or 14 are caused to collapse, when power line 11 or 13 with canopy lines 53 or 28, respectively, are completely unwound from drums 16 and 17. Such collapse minizes wind resistance, as the respective trains are pulled in against the wind toward the unique line pulleys.

As illustrated in FIGS. 2 and 3, canopy line 28 is held relatively fixed; while power line 13 continues to play out. This causes the canopy cup to become inverted. The action of the cup faciltes the collapase of the cup during the invension. Thus, the canopy crown 29 is moved relative to the periphery of the canopy so that the said canopy collapses.

The movement of the power lines relative to the canopy lines is caused by means including pulley assemblies 63 and 63A. The pulley assemblies 63 and 63A comprise fixed pulleys, along with movable pulleys mounted to arms 65 and 66. At its earthward end, power line 13 is extended through pulley assembly 63 having movable pulleys on pulley carriage 64. In this embodiment pulley carriage 64 includes a pair of arms 65 and 66 supported by a vertical upright power line 67. Pulley assembly 63A similarly guides power line 11 at the opposite end of pulley carriage 64.

Vertical upright 67 is threadably mounted on threaded shaft 68 and travels along the threaded portion thereof. As pulley carriage 64 travels in direction E along threaded shaft 68, the movable pulleys of pulley assembly 63 are drawn along; thus, effectively lengthening power line 13 with respect to canopy line 28 until parakites 14 collapse at the same time parakites 12 are being "armed" by the shortening of power line 11 with respect to canopy line 53. The parakites stay in their respective "armed" and "disarmed" conditions and pulley carriage 64 remains stationary until drum 17 is substantially wound and drum 16 is substantially unwound. At this time, when pulley carriage 64 travels in direction D, power line 11 is played out, causing parakites 12 to collapse and pulling in power line 13, "arming" parakites 14. In this manner, alternating trains of parakites are sequentially "armed" and "disarmed".

Control of pulley carriage 64 is accomplished by generator gates G7, G8, G9, G10 and G11 and generator clutches C1 and C4 in the following manner. With clutch C1 engaged and clutch C4 disengaged, generator shaft 22 and threaded shaft 68 are rotated in direction F to move pulley carriage 64 in direction D. When clutch C1 is disengaged and clutch C4 is engaged, the rotation of shaft 68 is reversed through the rotation of gears G9, G10, G11, auxiliary shaft 69 and gears G8 and G7. Clutches C1 and C4 are normally disengaged. During this period of rotation, pulley carriage 64 is moved in direction E to "disarm" the parakites mounted on power line 13 and to "arm" the parakites mounted on power line 11.

To provide for automatic operation in sequencing of the various gears, shafts and clutches described in detail above, limit switches S1, S2, S3 and S4 are provided and are utilized in the following manner. As drum 17 is unwinding, and drum 16 is winding, drum shaft 21 is rotating in direction A, clutch C2 is engaged, and clutch C3 is disengaged. Simultaneously, winding arms 56 and 57 are moving along drum shaft 21 from left to right. Winding arm 57 is thus approaching limit switch S4.

The switch S4 is positioned so that winding arm 57 reaches switch S4 slightly before drum 16 is fully wound, and drum 17 is fully unwound. At that point, limit switch S4 is activated to disengage clutch C2 and engage clutch C4. Since clutch C3 is disengaged at this time, drum shaft 21 is prepared for the change in rotation which will occur when drum 16 starts to unwind responsive to the "arming" of train 18 attached to the power line 11. The action of the engaged clutch C4 causes pulley carriage 64 to move along shaft portion 68 in direction E toward limit switch S1, with clutch C1 disengaged and clutch C4 engaged.

When limit switch S1 is reached, clutch C3 is engaged, and clutch C4 is disengaged, thereby stopping rotation of shaft portion 68 and applying torque to shaft 22 in direction F. This releases the parakites of train 18 controlled by fully wound drum 16 and are thus "armed"; while the parakites of train 19 controlled by drum 17 are "disarmed".

When drum 17 is fully wound, then switch S3 is operated by arm 56. At this time, responsive to the operation of switch S3, clutch C3 is disengaged, and clutch C1 is engaged. With clutches C2 and C3 disengaged, shaft 21 is being prepared to reverse directions. The engagement of clutch C1 caused pulley assembly 64 to move in direction D. The movement of pulley carriage 64 in direction D "arms" parakites 14 due to the relative shortening of power line 13 and "disarms" parakites 12 due to the relative lengthening of power line 11.

The pulley carriage travels in the direction D until switch S2 is operated. Responsive to the operation of switch S2, clutch C1 is disengaged, and clutch C2 is engaged. With clutches C1 and C4 disengaged, the carriage remains stationary. With clutch C2 engaged and shaft 21 going in direction A, torque is applied driving shaft 22 in direction F.

In this manner drum shaft 21 is rotated both clockwise and counter-clockwise. Drums 16 and 17 are, respectively, wound and unwound; while power lines 13 and 11 and canopy lines 28 and 53, respectively, are guided smoothly onto their respective drums. Note that the idler shaft 62 maintains its uni-directionality of rotation and imparts its rotation to generator shaft 22. The rotation of threaded shaft portion 68 is reversed whenever the "armed" train is to be "disarmed", and the "disarmed" train is to be "armed". The power lines 11 and 13 are alternately shortened and lengthened to either affect "disarming" or "arming" of parakites 12 and 14. The periods of clockwise or counter-clockwise rotation of shaft 21 and shaft 68 are controlled by the location of switches S3, S4 and S1, S2, respectively.

Figure 12:
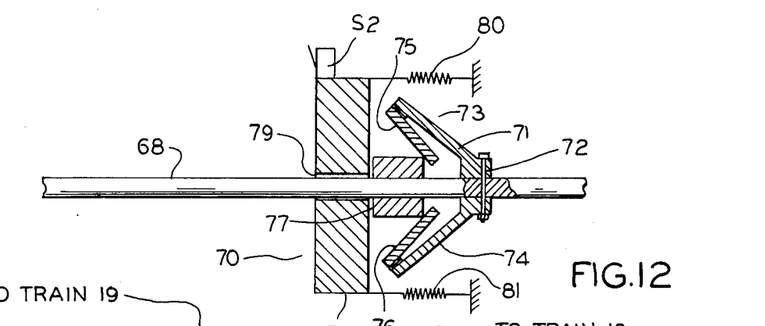
FIG. 12 is a side sectional view of a governor utilized to limit the extent of arming of a train of parakites during operation of the apparatus.

To provide an added measure of protection during unusually severe wind conditions, a governor one of the shafts may be employed to limit the forces applied through power lines 11 and 13. As illustrated in FIG. 12, governor 70 features a spinner 71 mounted to shaft portion 68 by pin 72. Spinner 71 has radially extending arms 73 and 74 to which segments 75 and 76, extending radially inward, are hinged. Slip collar 77 is slidingly mounted on shaft 68. Mounting block 78, to which switch S2 is attached, has block aperture 79 through which shaft 68 passes, and may thus be pushed along shaft 68 without rotating therewith. Under normal operating conditions, mountting block 78 is spring biased by springs 80 and 81 to remain a given distance from switch S1 so that pulley carriage vertical support 67 has to travel that given distance between switches S1 and S2 for the "arming"-"disarming" operation.

When high wind velocities cause power lines 11 or 13 to play out at speeds approaching the limits for which the system is designed, shaft 68 then rotates fast enough so that spinner 71 applies a centripetal force to arms 75 and 76 to bring them axially outward against slip collar 77 and mounting block 78. The spinner at the faster rotation moves mounting block 78 and switch S2 closer to switch S1, thus limiting the travel of pulley carriage 64 during the "arming" or "disarming" periods. The rewinding and unwinding, therefore, is initiated with the parakites partially "armed" and "disarmed", because of the shorter allowable travel of the individual power lines relative to the canopy lines. The partial "arming", of course, limits the force applied to the parakites to enable the system to function without being torn to pieces by high winds.

When rotation of shaft portion 68 slows, arms 75 and 76 move inwardly and mounting block 78 moves back towards its original position, thus effectively lengthening, once again, the outward travel of all power lines. A similar spinner and mounting block arrangement is also provided for switch S1 to control the extent of the "arming" and "disarming" of the parakites at the other end of shaft 68.

In another embodiment, means are provided for optimizing the power obtained from the system notwithstanding the normally occurring varying wind velocities. It is known that the maximum power output of the system occurs, when the velocity of the parakites is one-third of the wind velocity. Therefore, the means for optimizing the power output includes means for measuring the wind velocity.

The system utilizes an indirect method of measuring the average wind velocity component at given angles of elevation $\alpha$ (FIG. 8) acting on the train as a whole, when the train is at the angle of elevation $\alpha$. The actual measurements are taken at ground level. This is accomplished, for example, as shown in FIG. 11, with tachometer 151, schematically shown attached to pulley 152 of pulley assembly 63. The tachometer, of course, gives the velocity of the movement of train 19. The velocity of train 19 is a function of the wind velocity and the load on the train 19. The pulling force of the train is measured by means, such as tensiometer 153, shown schematically in FIG. 11 coupled to movable pulley 154 mounted between fixed pulleys.

By locking drums 16 and 17 to obtain a tensiometer 153 reading and subsequently unlocking the drums and reading again tensiometer 153 along with tachometer 151, the constant K can be computed. This computation is made only once:

$$\left(\frac{\sqrt{F_1} - \sqrt{F_2}}{v_p}\right)^2$$

where:
$F_1$ = the force at the tensiometer with the drums locked;
$F_2$ = the force at the tensiometer with the drums unlocked; and
$v$ = the speed at which the parakite train p is unreeling when the drums are unlocked.

For any load and wind condition encountered, there will be a corresponding tensiometer reading $F_x$ and tachometer reading $V_{px}$. These two readings, in conjunction with constant K obtained above, can be used in the following equation to determine the new parakite train speed setting $V_{py}$ required for maximum power output:

$$V_{py} = \frac{1}{3} \text{(Avg. wind vel. component at angle } \alpha\text{)} = \frac{1}{3} V_w = \frac{1}{3}\left(\sqrt{\frac{F_x}{K}} + V_{px}\right)$$

As shown in the automated system of FIG. 11, the values of variables $F_x$ and $V_{px}$ are plugged into a programmed computer 156 to determine the value of $V_{py}$. The computer then controls a constant horsepower variable speed power drive 120 to increase or decrease the load on the system until the desired unreeling speed $V_{py}$ is achieved.

When a wind speed change of reasonable magnitude and permanence occurs, reading $V_{py}$ and its corresponding reading $F_y$ will change and the automatic system will set a new value for $V_p$.

Figure 13:
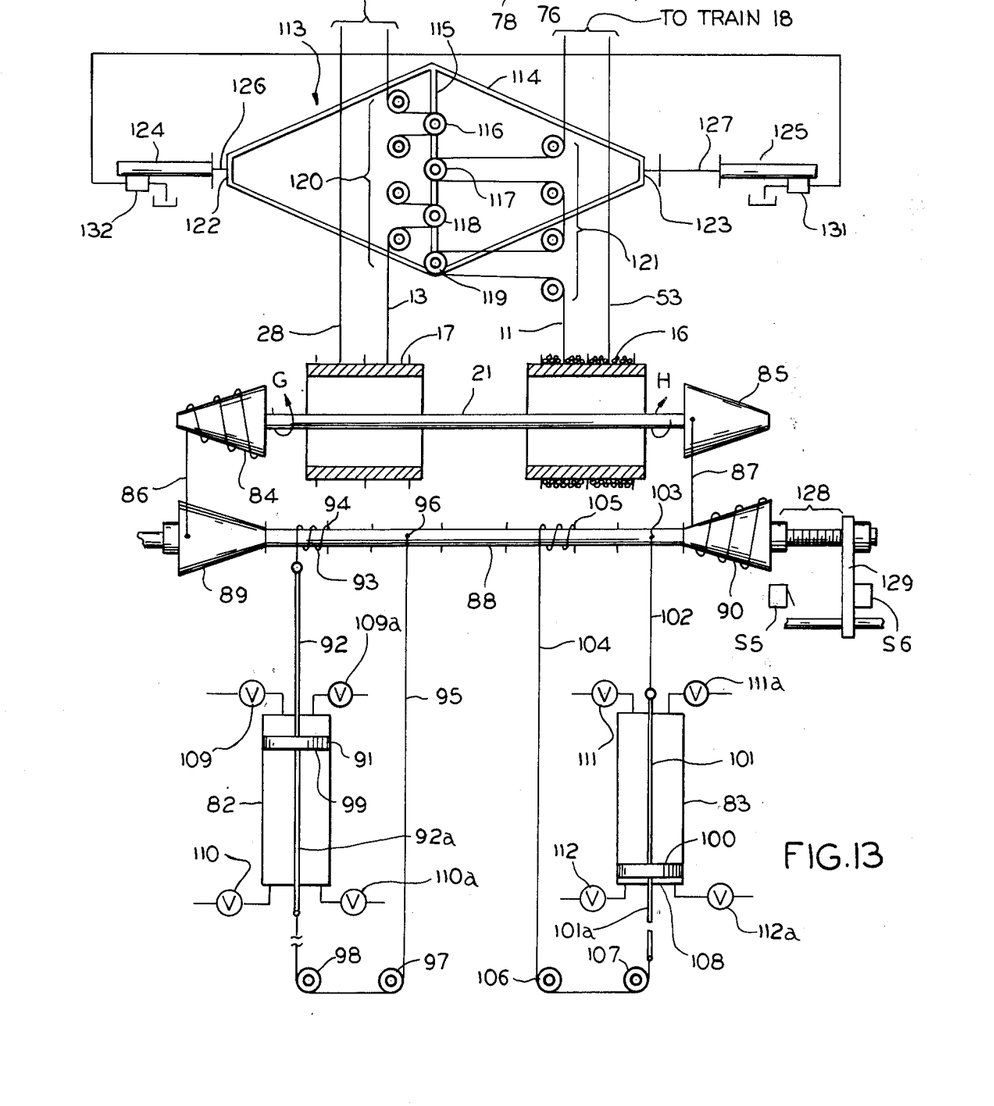
FIG. 13 is a plan view of an alternate gearing arrangement shown utilized to operate air compressors.

Although not shown in FIG. 13, a similar system can be employed in that embodiment for the purpose of maximizing power output.

Thus, the method and equipment described herein can be used to determine the actual wind velocity at given altitudes. From the above equation it follows that if:

$$V_p = 0, V_w = \sqrt{\frac{F}{K}}.$$

This wind velocity component at angle $\alpha$ can be used to obtain the full magnitude of the wind vector from the following equation:

$$V_w = \sec \alpha \sqrt{\frac{F}{K}}.$$

The altitude of the wind vector is represented by H = L sin $\alpha$, where L represents the length of the line. Since the horizontal direction of the line determines the direction of the wind, the wind vector is completely defined at a given height H. Since the constant K has been determined as described above, the wind velocity vector can be determined at different lengths H as a function of the line length L, angle of elevation $\alpha$ and line tension F, all measured at ground level. Hence, a new anemometer for measuring wind velocity at desired altitudes from the ground is described. The new anemometer does not use telemetering, nor expendable components.

For purposes of measuring the wind velocity, the wind driven object or objects at the end of the power line do not necessarily have to take the shape of the parakite described herein, since the generation of power is not the criteria. Also, it should be realized that, just as with the prior art anemometers, calibrations have to be made. Correction, for example, is required for the interacting effects that the weight of the line, and the weight, size and angle of attack of the flying object have on the curvature of the line, as it affects the reading of angle $\alpha$.

FIG. 13 illustrates schematically an embodiment of the present invention adapted to operate air compressors 82 and 83. Air from compressors 82 and 83 may be stored under pressure in a large reservoir to be utilized, for example, to drive a compressed air turbine, or the like.

As hereinabove described, power lines 11 and 13 are arranged in tandem, such that when train 18 is "armed", train 19 is "disarmed". Power line 13 and canopy line 28 are wound onto drum 17; while power line 11 and canopy line 53 are wound onto drum 16. Both drums 16 and 17 are shown in section. Drums 16 and 17 are mounted to drum shaft 21, as are conical drums 84 and 85 to which cables 86 and 87 are affixed. Compressor drive shaft 88 has conical drums 89 and 90 mounted thereon to which are attached, respectively, cables 86 and 87. Drums 89 and 90 may have V-belt grooves formed thereon in a helical pattern, and cables 86 and 87 may be two-sided V-belts sized to fit said grooves.

As presently illustrated, when drum shaft 21 rotates in direction G, responsive to the unreeling of drum 16, cable 87 is drawn from conical drum 90 to conical drum 85, thereby rotating compressor shaft 88 in a first direction. Similarly, when drum 17 is unwinding, drum shaft 21 rotates in direction H to drive cable 86 from drum 89 to drum 84, thereby rotating compressor shaft 88 in a second direction.

Piston 91 of compressor 82 is joined to piston rod 92 which, in turn, is joined to piston rod cable 93 affixed to compressor shaft 88 at 94. Piston cable 95 is joined to compressor shaft 88 at 96, and is then drawn via pulleys 97 and 98 to piston rod 92a on the opposite face 99 of piston 91. Similarly, compressor 83 has piston 100 connected to piston rod 101 and piston cable 102 joined to compressor shaft 88 at 103. Piston cable 104, affixed to compressor shaft 88 at 105, proceeds over pulleys 106 and 107 to piston rod 101a on the opposite face 108 of piston 100.

As drum shaft 21 is rotated in directions G and H, the following sequence occurs. Piston cable 95 and piston rod cable 102 are wound onto compressor shaft 88, thereby drawing piston 91 in a downward stroke and piston 100 in an upward stroke. When the limit of travel of drum shaft 21 is reached, rotation is reversed; and piston rod cable 93 and piston cable 104 are thereby wound onto compressor shaft 88, reversing the strokes of piston 91 and 100. Thus, pistons 91 and 100 may be maintained in a periodic upward and downward stroking sequence to produce a steady output of compressed air. In this embodiment valves 109, 109a, 110, and 110a on compressor 82, and valves 111, 111a, 112, and 112a on compressor 83, enable both compressors to have a double-acting strokes in which air is taken in and compressed in both directions of piston travel.

It is well known that more work must be performed by piston 99 near the end of its stroke then at the beginning, and conical drums 84, 87, 89 and 90 are utilized to increase the force with which pistons 91 and 100 are drawn from the beginning of their strokes to the end. It should be understood that such a technique is readily adaptable to a plurality of shaft drawn and actuated pistons.

FIG. 13 also includes another embodiment of the pulley carriage utilized to "arm" and "disarm" trains 18 and 19. Pulley carriage 113 is illustrated as essentially a parallelogram framework 114, having a cross brace member 115 to which are mounted pulleys 116, 117, 118 and 119. The remaining pulley assemblies, 120 and 121, respectively, are mounted to a rigid support, not herein shown. Framework 114 is supported at ends 122 and 123 by hydraulic cylinder assemblies 124 and 125, respectively. More particularly, framework 114 is supported on hydraulically operated rods 126 and 127.

The "arming" and "disarming" of trains 18 and 19 are controlled by the distance through which hydraulic rods 126 and 127 move framework 114. The sequence and timing of travel may be controlled by limit switches S5 and S6. Compressor shaft 88 may have threaded shaft portion 128 on which arm 129 is threaded and along which arm 129 travels responsive to the rotation of shaft 88.

Assume that drum 17 is almost unwound and drum 16 is almost fully wound. At that time, train 18 is "disarmed" and train 19 is "armed". When switch S6 is operated by arm 129, responsive to the operation of switch S6, valve 131 is operated causing piston rod 127 to extend from cylinder 125, and valve 132 is operated to enable piston rod 126 to retract into cylinder 124. Thus, carriage 113 moves inward relative to canopy line 53, thereby "arming" train 18. Simultaneously, power line 13 moves outwardly relative to canopy line 28, thereby "disarming" train 19.

When drum 17 is fully wound and drum 16 is unwound, then switch S5 is actuated by arm 129 to cause piston rod 126 to extend and piston rod 127 to retract moving carriage 113 to the right. This "arms" train 19 and "disarms" train 18.

The governor arrangement of FIG. 12 can be adapted to operate with the embodiment of FIG. 13. For example, the governor can be mounted to one of the shafts, such as shaft 21. The switches S1 and S2, in this case, are used to control the limits of travel of piston rods 126 and 127 to thereby partially "arm" and "disarm" the trains during the "arming" sequence.

While the foregoing descriptions have, for the most part, been limited to a device employing two parakite trains; it is to be understood that the device is readily adaptable to utilize a plurality of such trains, to minimize the inconvenience and inefficiency occasioned by tangling of the trains as the power lines are played out and brought back.

When the balloon of FIG. 8 is used as a series of helium-charged balloons to keep individual parakites, and thus the parakite train, aloft during periods of light winds, they can also be used to prevent entanglement of the trains. Varying the volume of helium within the individual balloons would not only provide more lift during periods of slack wind, but would also provide a convenient method for adjusting the angle at which the individual parakite trains are maintained to the horizontal during periods of normal wind velocity.

The balloons on the parakites of adjacent power lines may be also used to vary the relative angles of elevation of the trains. Thus, for example, when the wind is blowing in the direction W in FIG. 1, the trains 18 and 19 may be at the same angle of elevation. However, when the wind is blowing toward the top of the page, then train 18 is maintained at a larger angle of elevation than is train 19. If the wind shifts from the direction W, shown in FIG. 1, toward the bottom of the page, then train 19 should be raised to a larger angle of elevation than train 18. This can be accomplished by selectively inflating or deflating balloons of the trains. Thus, only when the wind is blowing normal to shaft 21 are the trains at equal angles of elevation.

This control of the angle of elevation would also provide greater control over such concerns as limiting amount of ground area swept by the trains during winding and unwinding, and would enable the angle of attack to be changed in order to take full advantage and make full use of prevailing winds.

In operation the parakite trains are launched by first winding up the drum of each train an equal amount, then by inflating the "sky anchor" of only the train that is "disarmed" by carriage 64 or 114, and letting it lift the train into the prevailing winds. Shaft 21 is then locked, and the "sky anchor" of the "armed" train is inflated and lofted into the air. Shaft 21 is unlocked and the "armed" train lifts into the air, simultaneously winding the lines of the "disarmed" train. The system is not operative. Subsequently, the "arming" and "disarming" proceeds as described hereinbefore.

To ground the parakite train pairs, shaft 21 is locked prior to the "arming"-"disarming" point. The "disarmed" train is hauled in independent of its drum; and, consequently, of the "armed" train. The shaft 21 is unlocked and the "armed" train is allowed to go until its drum is unwound; then it is "disarmed" in the usual manner. The "disarmed" train is then hauled in to complete the grounding.

While it is contemplated that systems such as those described above could be used for individual rural buildings to provide sources of power, it is also contemplated that the systems described above could be large units for generating power in amounts such that they are suitable for connecting to the interstate power grid system.

The system can be used with equal facility over desolate or uninhabited areas, as well as over rich farm land and provide a second harvest in the form of energy for the country's hard pressed farmers during our present energy crisis.

Since the system is capable of seeking winds at higher altitudes, it is not restricted as to location. Therefore, the system can be readily located in the vicinity of existing storage areas, such as mined caverns, solution mined salt cavities, depleted oil and natural gas wells and aquafiers. The proximity to these storage areas simplifies the energy storage problems when pneumatic conversion is used and enables a more constant power output in spite of the varying winds.

While the foregoing has presented specific embodiments of the invention herein described, it is to be understood that such embodiments have been presented by way of example only. It is expected that others skilled in the art will provide variations which, while differing from the foregoing, do not depart from the spirit and scope of the invention.

I claim:

1. A method for using the wind to drive energy conversion means,
    said method using wind flown devices, such as parakites, attached through power lines to drums coupled to energy conversion means,
    said wind flown devices being arranged in pairs of trains of such devices where one train is being driven outward and the other train is being reeled inward,
    said method comprising the steps of:
    arming a first of said trains to enable the train to be forced outwardly by the wind and disarming the other train of said pair of trains to reduce the force required to reel the other train in,
    disarming the train that is forced outwardly a desired amount and simultaneously arming the train that has been reeled in a desired amount, whereby the train that was reeled in is now forced outwardly and the train that was forced outwardly can now be reeled in with less force, and
    retaining the outward most parakite of each of said trains armed even when the train is disarmed.

2. A system for using wind to drive energy conversion means,
    said system comprising frameless parakite means,
    said parakite means comprising parachute-shaped kite means constructed from pliable material,
    said parakite means comprising at least one pair of trains of parakites,
    each of said trains comprising a plurality of parakites serially connected,
    energy conversion shaft means coupled to drive the energy conversion means,
    means for coupling said parakite means to rotate the energy conversion shaft means responsive to wind forces, and means for arming one of said at least one pair of trains of parakites and disarming the other one of said pair of trains to move reciprocatingly.

3. The system of claim 2 wherein said at least one pair of trains includes means for controlling the angle of elevation of said trains.

4. The system of claim 3 wherein said means for controlling the angle of elevation of said trains comprises lighter than air gas compartment in the parakite furthest removed from said energy conversion shaft means.

5. The system of claim 3 wherein said means for controlling the angle of elevation of said trains comprises balloon means.

6. The system of claim 5 wherein means are provided for supplying said balloon means lighter than air gas from the ground while said balloon means are aloft.

7. The system of claim 6 wherein means are provided for selectively inflating or deflating said balloon means.

8. The device of claim 2 wherein said means for coupling said parakite train means to said shaft means comprises drum means,
means for coupling said drum means to said energy conversion shaft means,
line means extending seriately from said drum means to each of said parakites of said trains,
unique pulley means for enabling said line means to be fed onto or away from said drum means regardless of the direction of the wind exerting a force on said train means,
said pulley means comprises a fixed plate, a rotatable plate mounted to said fixed plate means and rotatable relative thereto,
bale means mounted on said rotatable plate,
concentric apertures extending through said rotatable plate and said fixed plate means,
at least one pulley mounted to said bale means for directing said line means over said pulley and through said concentric aperture means,
retaining means over said pulley for keeping said line means juxtaposed to said pulley, and
said bale means being mounted off-center on said rotatable plate, whereby said rotatable plate is caused to rotate by the wind acting through said line means to direct said line means through the aperture means regardless of the direction of the wind.

9. A system for using wind to drive the energy conversion means of claim 2 wherein means are provided for arming said at least one pair of trains of parakites and simultaneously disarming the other at least one pair of trains of parakites to move reciprocatingly.

10. A system for using the wind to drive energy conversion means,
said system comprising parakite means,
energy conversion shaft means coupled to drive the energy conversion means,
means for coupling said parakite means to operate the energy conversion shaft means responsive to wind forces,
said parakite means comprising at least one pair of trains of said parakites,
each of said trains comprising a plurality of parakites,
means for serially connecting each of the parakites of said plurality of parakites,
means for arming one of said at least one pair of trains of parakites and disarming the other of said at least one pair of trains of parakites, and
wherein the parakite furthest removed from said energy conversion shaft of each of said serially connected pair of said trains of parakites always remains armed.

11. The system of claim 10 wherein said parakite means comprise parachute-like kites having canopies of pliable material,
shroud lines coupled to said canopies, and
wherein said means for serially connecting said parakite means comprises power line means running to the shroud lines of each of said parakites of said plurality of parakites in said train up to the penultimate outer parakite of the train,
drum means for reeling in and out said power line means,
coupling means coupling said drum means to said energy conversion shaft means, and
aperture means in each of said canopies up to the penultimate parakite canopy to enable said power line means to pass through the respective canopies to extend to the next successive parakite.

12. The system of claim 11 including canopy line means extending from said drum means through the shroud lines to the crown of each of the canopies of each of the successive parakites in the trains up to and including the penultimate outer parakite in the train, and
means for coupling the canopy line means to the shroud lines of the outer parakite in the train, whereby the outer parakite keeps the canopy line means taut.

13. The system of claim 12 wherein said means for arming the one train of parakites and simultaneously disarming the other of said train comprises gearing arrangement means,
said gearing arrangement means including said drum means, wherein said drum means comprises a first drum connected to said one of said trains and a second drum connected to the other of said trains,
drum shaft means coupling the first and second drums together, whereby when one of the trains of the pair of trains is being forced outwardly by the wind, the other train is being reeled in, and
wherein said coupling means couples said drum shaft means to said energy conversion shaft means to drive said energy conversion means responsive to wind forces.

14. The system of claim 13 including means for varying the length of said power line means relative to said canopy line means by increasing the length of said power line means relative to said canopy line means for disarming said one train, when the one train has been forced outwardly a desired distance and for simultaneously decreasing the length of the power line means relative to the canopy line means of the other train for arming said other train.

15. The system of claim 14 wherein said means for varying the length of the power line means relative to said canopy line means comprises pulley carriage means,
said pulley carriage means having first and second pulley means thereon,
third and fourth pulley means removed from said pulley carriage means but juxtaposed to the first and second pulley means on said carriage, respectively, and said power line means of said one of said trains passing over said first pulley means on said carriage means and said third pulley means, said power line means of said other of said trains passing over said second pulley means on said carriage and said fourth pulley means, and means for moving said pulley carriage means to arm and disarm alternate ones of said pair of trains.

16. The system of claim 15 wherein said means for moving said pulley carriage comprises first control means operated responsive to the reeling in of one train a desired amount for causing said pulley carriage means to move in a first direction, second control means operated responsive to said other of said trains being reeled in a desired amount for moving said pulley carriage means in an opposite direction, and said movement of said pulley carriage means normally being sufficient to fully arm the train being armed.

17. The system of claim 16 wherein said first control means includes first switch means, first clutch means operated responsive to the operation of said first switch means, threaded shaft means, means for mounting said pulley carriage means on said threaded shaft means so that said pulley carriage means moves in said first direction when said threaded shaft means moves counter-clockwise, means responsive to the operation of said first clutch means for causing said threaded shaft means to move in the counter-clockwise direction, and wherein second control means includes second switch means, second clutch means operated responsive to the operation of said second switch means, means responsive to the operation of said second clutch means for causing said threaded shaft portion to move in a clockwise direction and consequently to move said carriage in said opposite direction.

18. The system of claim 17 wherein said coupling means for coupling said drum means to said energy conversion shaft means comprises third switch means operated responsive to said carriage means moving a desired distance in said first direction for disconnecting said first clutch means, whereby the rotational forces on said threaded shaft portion are removed, third clutch means operated responsive to the operation of said third switch means for coupling said drum shaft means to said energy conversion shaft means and operated responsive to the operation of said second switch means for uncoupling said drum means from said energy conversion shaft means, fourth switch means operated responsive to said carriage means moving in said opposite direction a desired distance for disconnecting said second clutch means, whereby the rotational forces on said threaded shaft portion are removed, and fourth clutch means operated responsive to the operation of said fourth switch means for coupling said drum shaft means to said energy conversion shaft means and operated responsive to the operation of said first switch means for uncoupling said drum means from said energy conversion shaft means.

19. The system of claim 15 wherein said means for moving said pulley carriage comprises cylinder and piston means attached to said pulley carriage, fifth switch means operated responsive to one of said trains being reeled in on said first drum a desired amount, valve means associated with said cylinder and piston means operated responsive to the operation of said first control means to move said pulley carriage means in the first direction, sixth switch means operated responsive to said second train being reeled in on said second drum a desired amount, and valve means on said cylinder and piston means operated to move said pulley means in a second direction opposite said first direction responsive to the operation of said piston shaft means.

20. The system of claim 16 including means for only partially arming the trains being armed.

21. The system of claim 13 wherein said energy conversion means comprises air compressor means, and wherein said coupling means comprises a first conical drum connected to said drum shaft means juxtaposed to said first drum means, a second conical drum connected to said drum shaft means juxtaposed to said second drum, said first and second conical drum means being tapered from the center of said shaft, third conical drum means on said energy conversion shaft means juxtaposed to said first conical drum means, fourth conical drum means on said energy conversion shaft means juxtaposed to said second conical drum, said third and fourth conical drum means being tapered toward the center of said energy conversion shaft means, said first and third conical drum means being coupled by first cable means wound so as to drive said energy conversion shaft means in a counterclockwise direction when said drum shaft means is driven in a clockwise direction, said second and fourth conical drum means being coupled by second cable means wound so that said energy conversion shaft means is driven in a clockwise direction when said drum shaft means is driven in a counterclockwise direction, and wherein said energy conversion shaft means comprises double acting reciprocating piston cylinder air compressor.

22. The system of claim 17 including means for partially arming the trains, said means for partially arming the trains comprises governor means, said governor means comprising means for automatically moving said third and fourth switch means closer together responsive to higher wind forces.

23. The system of claim 22 wherein said governor means comprises spinner means mounted to said threaded shaft portion, centripetal segments hinged to said spinner, means for mounting said third and fourth switches to movable block means, and means for moving said movable block means responsive to forces applied by centripetal segments when said threaded shaft portion rotates in excess of a certain speed.

24. The system of claim 10 including variable loading means for automatically setting the armed trains outward speed to one-third the speed of the wind driving said armed train.

25. The system of claim 24 wherein tachometer means are provided for measuring the speed of the outward travel of the armed train,
tensiometer means for measuuring the force applied to said armed train, and
wherein said energy conversion shaft means is coupled to said energy conversion means through variable loading means, and
means responsive to the tensiometer and the tachometer for controlling the variable loading means to change the load on the outwardly moving armed train so that the outward movement proceeds at a speed of approximately one third the speed of the wind on said armed train.

26. The system of claim 25 wherein said variable loading means comprises variable gear means.

27. The system of claim 26 wherein computer means are provided for controlling said variable gear means responsive to variations in outward moving velocity and tensiometer readings.

* * * * *

UNITED STATES PATENT AND TRADEMARK OFFICE
CERTIFICATE OF CORRECTION

PATENT NO. : 4,124,182
DATED : November 7, 1978
INVENTOR(S) : Arnold Loeb

It is certified that error appears in the above-identified patent and that said Letters Patent are hereby corrected as shown below:

| | |
|---|---|
| Col. 2, Line 25 | Change "by driven" should be --be driven--. |
| Col. 3, Line 62 | Change "ligher" should be --lighter--. |
| Col. 4, Line 67 | Change "to the the shroud" should be --to the shroud--. |
| Col. 5, Line 29 | Change "stabilizaztion" should be --stabilization--. |
| Col. 7, Line 61 | Change "facilites the collapase" should be --facilitates the collapse--. |
| Col. 7, Line 63 | After "moved" add --downward--. |
| Col. 8, Line 26 | Change "gates" should be --gears--. |
| Col. 10, Line 35 | Before the computation in"( )", add --K =--. |
| Col. 10, Line 43-44 | Change "v = the speed at which the parakite train p is unreeling when the drums are unlocked" should be --$v_p$ = the speed at which the parakite train is unreeling when the drums are unlocked--. |
| Col. 13, Line 43 | Change "inflating or" should be --inflating and--. |

UNITED STATES PATENT AND TRADEMARK OFFICE
CERTIFICATE OF CORRECTION

PATENT NO. : 4,124,182

DATED : November 7, 1978

INVENTOR(S) : Arnold Loeb

It is certified that error appears in the above-identified patent and that said Letters Patent are hereby corrected as shown below:

Col. 13, Line 60   Change "system is not" should be --system is now--.

Col. 15, Line 31   Change "said pulley" should be --said unique pulley--.

Signed and Sealed this

Sixth Day of March 1979

[SEAL]

Attest:

RUTH C. MASON
Attesting Officer

DONALD W. BANNER
Commissioner of Patents and Trademarks